Aug. 23, 1955  J. K. JACOBUS  2,716,167
TIRE INFLATION INDICATOR
Filed Oct. 9, 1952
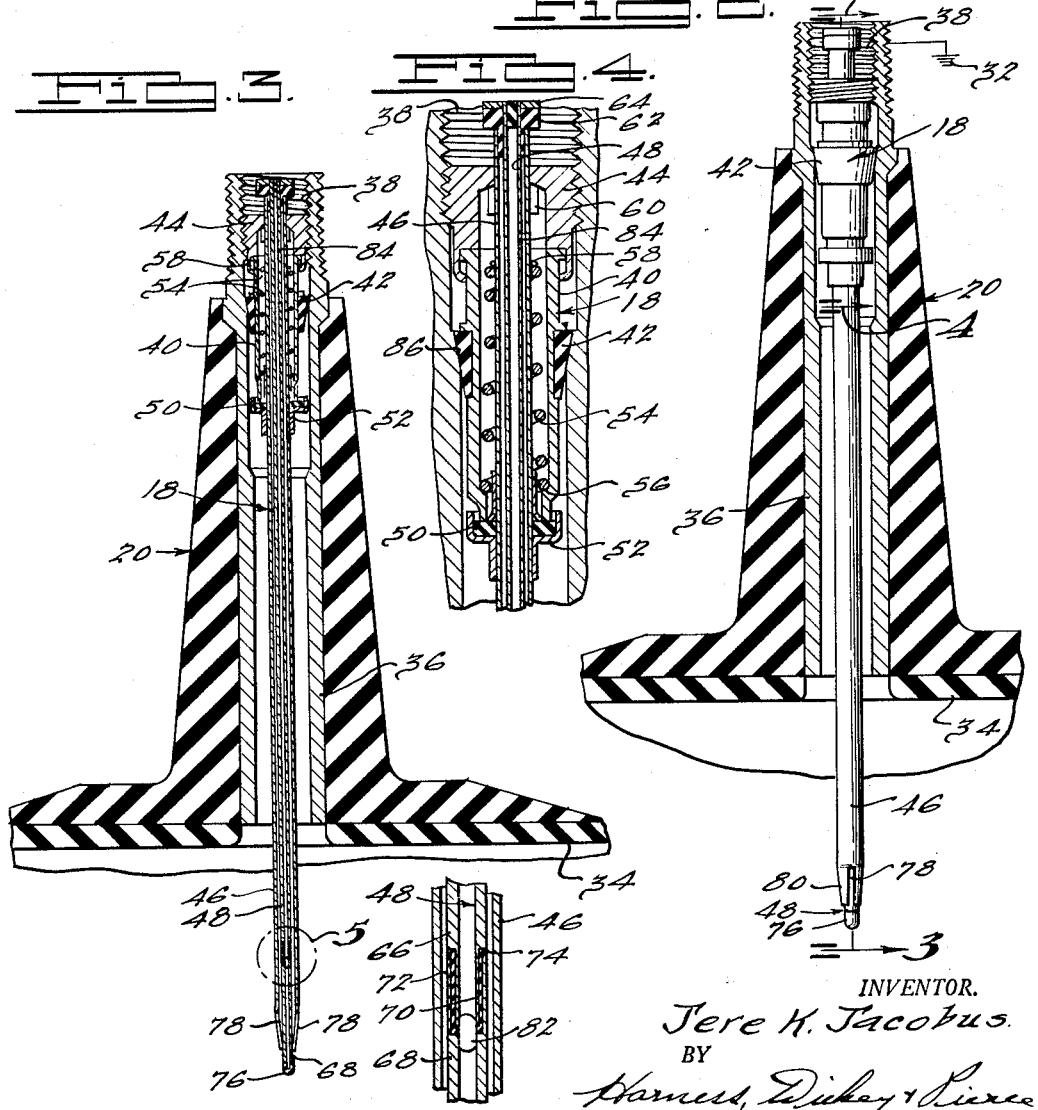
INVENTOR.
Jere K. Jacobus.
BY
Harness, Dickey & Pierce
ATTORNEYS.

United States Patent Office 2,716,167
Patented Aug. 23, 1955

2,716,167

TIRE INFLATION INDICATOR

Jere K. Jacobus, Port Huron, Mich.

Application October 9, 1952, Serial No. 313,896

9 Claims. (Cl. 200—61.25)

The present invention relates to an improved valve stem unit for an air indicator apparatus for an automobile tire or tire tube.

It is an object of the present invention to provide an improved valve stem unit for a tire air indicator apparatus which unit is so constructed and arranged that it may be mounted in a conventional tire or tire tube valve stem in place of the conventional valve core assembly without in any way modifying the valve stem.

A further object of the present invention is to provide an improved valve stem unit of the above mentioned type which is simple in design and reliable and efficient in operation.

Another object of the present invention is to provide an improved valve stem unit of the above mentioned type adapted to provide a sturdy circuit control means for an electrically operated tire air indicator apparatus which will not be damaged nor the operation of which will not be affected by the rough usage to which automobiles are frequently put as in driving them over excessively rough roads and the like.

Other and more detailed objects of the present invention will be apparent from a consideration of the following specification, the appended claims and the accompanying drawing, wherein:

Figure 1 is an elevational view of an automobile having parts broken away and illustrating somewhat diagrammatically a tire air indicator apparatus of the type in which the valve stem unit of the present invention is adapted to be used;

Figure 2 is an enlarged view of the valve stem of the front tire illustrated in Figure 1, showing the valve stem in section and showing the valve stem unit in elevation;

Figure 3 is a sectional view of the structure illustrated in Figure 2, taken substantially along the line 3—3 thereof;

Figure 4 is an enlarged sectional view of the structure illustrated in Figure 2 and taken substantially along the line 4—4 thereof; and, Figure 5 is an enlarged sectional view of that portion of the structure illustrated in Figure 3 indicated by the circle 5 therein.

The valve stem unit of the present invention is adapted for use in a tire air indicator apparatus of the type illustrated and described in my copending application, Serial No. 137,373, filed January 7, 1950, now Patent Number 2,658,119. The tire air indicator apparatus there described generally comprises a signal indicator such as a lamp bulb 10 mounted on the instrument panel 12 of an automobile 14, a suitable source of electrical power, which may be the conventional automobile battery indicated at 16, a circuit control means 18 mounted in the valve stem 20 and suitably connected to the lamp 10 and the battery 16 for controlling the operation of the lamp 10. This may be done in any suitable manner as by grounding one side of the battery 16 in conventional fashion as illustrated at 22, connecting one terminal of the lamp 10 to the other side of the battery 16 by a lead 24, and connecting the other terminal of the lamp 10, through a lead 26, a collector ring 28, and a brush indicated at 30, to one terminal of the valve stem circuit control unit 18, and suitably grounding the other terminal of the unit 18 as illustrated diagrammatically at 32.

Figures 2 and 3 illustrate a valve stem 20 mounted on a tire tube 34 in conventional manner and including the conventional metal sleeve member 36 which communicates at its inner end with the interior of the tube 34 and the outer end portion of which is internally threaded as indicated at 38 for the reception of the threaded element of a conventional valve core assembly. The valve stem circuit control unit 18 of the present invention generally comprises a tubular body 40 carrying an externally mounted annular tapered seal 42 and a threaded element 44 mounted on the outer end of the body 40 for rotary movement relative thereto. The above mentioned body 40, seal 42, and threaded element 44 may be of the same construction as their counterparts in a conventional valve core assembly. The valve stem unit 18 of the present invention also includes a pair of coaxial tubular members 46 and 48 extending axially through the threaded element 44 and the body 40. The outer tube member 46 carries a second annular seal 50 mounted in a supporting element 52 secured to the tube 46. The seal 50 is adapted to engage the inner end of the body 40 to prevent the flow of air through the body 40. A coil spring 54 is mounted within the body 40 in encircling relation with the tube 46 and has its inner end seated against a co-operating shoulder 56 provided by the body 40 and has its outer end abutting a ring 58 secured to the tube 46. It will thus be appreciated that the spring 54 acts to urge the seal 50 into engagement with the lower end of the body 40 to prevent the flow of air therethrough. As in its counterpart in a conventional valve core assembly, the threaded element 44 is provided with opposed apertures 60 through which air may flow in delivering air to or releasing it from the tire tube 34 when the seal 50 is moved out of engagement with the body 40 to an unseated position.

In the preferred embodiment illustrated, the inner tube 48 is longer than the outer tube 46 and extends beyond the tube 46 at both ends. At the upper end as viewed in the drawing, or the outer end when the valve stem unit 18 is mounted within the valve stem 36, the inner sleeve 48 is held in coaxial and spaced relation relative to the outer tube 46 by a suitable insulating material indicated at 62 and carries a contact ring 64 at its outer end which is also separated from the outer tube 46 by the insulating material 62.

As best illustrated in Figure 5, the inner sleeve 48 includes two separate portions 66 and 68 which have telescopically interfitting portions 70 and 72 for maintaining them in axial alignment. These telescopically interfitting portions 70 and 72 are held in spaced relation by a layer of insulating material 74 which forms a continuation of the bore of the tube 48 continuous with the portions of the bore formed in the tube portions 66 and 68. The tube portion 68 at the inner end of the tube 48 is closed at its inner end as by a suitable material such as the sealing wax indicated at 76 and extends beyond the inner end of the outer sleeve 46. The coaxial alignment of the tubes 46 and 48 is maintained by slotting the inner end of the outer tube 46 as indicated at 78 and tapering the inner end of the sleeve 46 inwardly as indicated at 80 so that the inner end of the tube 46 engages the inner end portion 68 of the inner tube 48.

As best illustrated in Figure 5, a short column of mercury indicated at 82 is disposed within the bore of the inner tube 48 and is freely movable therealong in response to a balancing of the pressures at the opposite sides thereof. The outer portion 66 of the inner tube 48, in the preferred embodiment illustrated, is provided with an aperture 84 disposed adjacent the outer ends of the tubes 46 and 48 to connect the bore of the inner tube 48 with the space between the tubes 46 and 48. Also, in the preferred embodiment illustrated, the tubes 46 and 48 are of a length such that when in assembled relation with the valve stem 20, they extend inwardly beyond the inner end of the metal sleeve 36 of the valve stem so that they project into the tire tube 34. Also, the portion 66 of the inner tube 48 is of a length such that the point of connection of the two tube portions 66 and 68 is adapted to be disposed within the tire tube 34 when the valve stem unit is mounted within the valve stem as illustrated in Figures 2 and 3 of the drawing.

As illustrated in the drawing, the portions 66 and 68 of the inner tube 48, the body 40, the spring 54, and the threaded element 44 are formed of an electrically conductive material so that when the valve stem unit is mounted in the sleeve member 36 of the valve stem 20, the inner portion 68 of the inner tube 48 is electrically connected to the sleeve member 36 and the outer portion 66 of the inner tube 48 is insulated from the other parts and carries the electrical contact ring 64. The electrical circuit of the above described apparatus may be completed for example, by suitably connecting the stationary brush 30 to the contact element 64, and grounding the sleeve member 36 as above mentioned and illustrated at 32.

It will now be appreciated that during the inflation of the tube 34 by the application of air pressure to the outer end of the sleeve member 36, the pressure of this air will unseat the seal 50 permitting the air to flow through the apertures 60 of the threaded elements 44, thence through the body 40 and past the seal 50, and thence inwardly through the sleeve member 36 into the tube 34. When the inflating operation is stopped the seal 50 will return to engagement with the body 40 preventing the escape of air through the body 40. It will be appreciated, of course, that the escape of air around the body 40 and through the sleeve member 36 is prevented by the annular tapered seal 42 which engages the conventional co-operating tapered seat 86 provided on the sleeve member 36. The air pressure within the tube 34 is transmitted through the slots 78 to the space between the tubes 46 and 48 and through the aperture 84 is transmitted to the bore of the inner tube 48 at the outer side, or upper side of the column of mercury 82, as viewed in the drawing. It will be appreciated that this pressure acting against the column of mercury 82 will cause it to move inwardly of the valve stem element until it assumes a position in which the air pressure within the closed inner end portion of the bore equals the air pressure communicated to the upper or outer portion of the bore through the aperture 84 and the slot 78.

In the preferred embodiment illustrated, the parts are so proportioned that the column of mercury 82 will assume the central position illustrated in Figure 5 when the tire tube 34 is inflated to the desired pressure. It will now be appreciated that as in the apparatus described in my above mentioned copending application, when the tire is thus properly inflated the lamp 10 will be lighted and when air is lost from the tire tube the column of mercury 82 will move upwardly as illustrated in the drawing to a position in which it is out of contact with the inner portion 68 of the tube 48 and no longer bridges and provides an electrical connection between the tube portions 66 and 68. When this happens the lamp 10 will go out, signalling a change in the inflation of the tire.

While only one specific embodiment of this invention has been illustrated and described in detail, it will be readily appreciated by those skilled in the art that numerous modifications and changes may be made without departing from the spirit of the present invention.

What is claimed is:

1. A valve stem unit for an air indicator apparatus for an automobile tire or tire tube having a valve stem including a sleeve member formed of electrically conductive material and having one end open and adapted to communicate with the interior of said tire or tire tube, said air indicator apparatus including an electrically operated signal for indicating predetermined changes in the air mass within said tire or tube, said valve stem unit being adapted to replace a conventional valve core assembly and comprising a generally tubular body having an annular seal adapted to engage a co-operating seat on said sleeve member, means connected to said body and adapted to engage said sleeve member for moving said seal to and from said seat, a second seal movable to and from a position in which it engages said body to prevent the flow of air therethrough, a tube disposed axially of said body and including first and second axially spaced portions formed of electrically conductive material and insulated from each other, means closing the bore of one of said tube portions in spaced relation to the adjacent ends of said portions, a body of electrically conductive liquid material disposed in said tube for movement in response to a balancing of the air pressures at the opposite sides thereof to and from a position in which it electrically connects said tube portions, said tube having an opening at the opposite side of said body of liquid from said means closing said bore through which the bore of said tube is adapted to communicate with the interior of said tire or tire tube, said tube being connected to said second seal for moving the latter from engagement with said body to permit the flow of air therethrough, and means yieldably urging said second seal into engagement with said body, the construction and arrangement of said valve stem unit being such that when in use, one of said tube portions is electrically connected to said sleeve member and the other of said tube portions is provided with contact means disposed adjacent the outer end of said sleeve member.

2. A valve stem unit for an air indicator apparatus for an automobile tire or tire tube having a valve stem including a sleeve member formed of electrically conductive material and having one end open and adapted to communicate with the interior of said tire or tire tube, said air indicator apparatus including an electrically operated signal for indicating predetermined changes in the air mass within said tire or tube, said valve stem unit being adapted to replace a conventional valve core assembly and comprising a generally tubular body having an annular seal adapted to engage a co-operating seat on said sleeve member, means connected to said body and adapted to engage said sleeve member for moving said seal to and from said seat, a second seal movable to and from a position in which it engages said body to prevent the flow of air therethrough, a tube disposed axially of said body and including first and second axially spaced portions formed of electrically conductive material and insulated from each other, means closing the bore of one of said tube portions in spaced relation to the adjacent ends of said portions, a body of electrically conductive liquid material disposed in said tube for movement in response to a balancing of the air pressures at the opposite sides thereof to and from a position in which it electrically connects said tube portions, said tube having an opening at the opposite side of said body of liquid from said means closing said bore through which the bore of said tube is adapted to communicate with the interior of said tire or tire tube, said tube being connected to said second seal for moving the latter from engagement with said body to permit the flow of air therethrough, means yieldably urging said second seal into engagement with said body, means adapted to electrically connect one of said tube portions to said sleeve member, the other of said tube portions having contact means adapted to be disposed adjacent the outer end of said sleeve member, and means insulating said other of said tube portions from said body.

3. A valve stem unit for an air indicator apparatus for an automobile tire or tire tube having a valve stem including a sleeve member formed of electrically conductive material and having one end open and adapted to communicate with the interior of said tire or tire tube, said air indicator apparatus including an electrically operated signal for indicating predetermined changes in the air mass within said tire or tube, said valve stem unit being adapted to replace a conventional valve core assembly and comprising a generally tubular body having an annular seal adapted to engage a co-operating seat on said sleeve member, means connected to said body and adapted to engage said sleeve member for moving said seal to and from said seat, a second seal movable to and from a position in which it engages said body to prevent the flow of air therethrough, a tube disposed axially of said body and including first and second axially spaced portions formed of electrically conductive material and insulated from each other, means closing the bore of one of said tube portions in spaced relation to the adjacent ends of said portions, a body of electrically conductive liquid material disposed in said tube for movement in response to a balancing of the air pressures at the opposite sides thereof to and from a position in which it electrically connects said tube portions, said tube having an opening at the opposite side of said body of liquid from said means closing said bore through which the bore of said tube is adapted to communicate with the interior of said tire or tire tube, said tube being connected to said second seal for moving the latter from engagement with said body to permit the flow of air therethrough, means yieldably urging said second seal into engagement with said body, means adapted to electrically connect one of said tube portions to said sleeve member, the other of said tube portions having contact means adapted to be disposed adjacent the outer end of said sleeve member, and means insulating said other of said tube portions from said body, a second tube of larger diameter than and coaxial with said first named tube, said second tube being electrically connected to one of said tube portions and insulated from the other.

4. A valve stem unit for an air indicator apparatus for an automobile tire or tire tube having a valve stem including a sleeve member formed of electrically conductive material and having one end open and adapted to communicate with the interior of said tire or tire tube, said air indicator apparatus including an electrically operated signal for indicating predetermined changes in the air mass within said tire or tube, said valve stem unit being adapted to replace a conventional valve core assembly and comprising a generally tubular body having an annular seal adapted to engage a co-operating seat on said sleeve member, means connected to said body and adapted to engage said sleeve member for moving said seal to and from said seat, a second seal movable to and from a position in which it engages said body to prevent the flow of air therethrough, a tube disposed axially of said body and including first and second axially spaced portions formed of electrically conductive material and insulated from each other, means closing the bore of one of said tube portions in spaced relation to the adjacent ends of said portions, a body of electrically conductive liquid material disposed in said tube for movement in response to a balancing of the air pressures at the opposite sides thereof to and from a position in which it electrically connects said tube portions, said tube having an opening at the opposite side of said body of liquid from said means closing said bore through which the bore of said tube is adapted to communicate with the interior of said tire or tire tube, said tube being connected to said second seal for moving the latter from engagement with said body to permit the flow of air therethrough, means yieldably urging said second seal into engagement with said body, means adapted to electrically connect one of said tube portions to said sleeve member, the other of said tube portions having contact means adapted to be disposed adjacent the outer end of said sleeve member, and means insulating said other of said tube portions from said body, a second tube of larger diameter than and coaxial with said first named tube, said second tube being electrically connected to one of said tube portions and insulated from the other, the space between said tubes being sealed at its outer end and communicating with said opening in said first named tube, said second tube having an opening through which said space between said tubes is adapted to communicate with the interior of said tire or said tire tube.

5. A valve stem unit for an air indicator apparatus for an automobile tire or tire tube having a valve stem including a sleeve member formed of electrically conductive material and having one end open and adapted to communicate with the interior of said tire or tire tube, said air indicator apparatus including an electrically operated signal for indicating predetermined changes in the air mass within said tire or tube, said valve stem unit being adapted to replace a conventional valve core assembly and comprising a generally tubular body having an annular seal adapted to engage a co-operating seat on said sleeve member, means connected to said body and adapted to engage said sleeve member for moving said seal to and from said seat, a second seal movable to and from a position in which it engages said body to prevent the flow of air therethrough, a tube disposed axially of said body and including first and second axially spaced portions formed of electrically conductive material and insulated from each other, means closing the bore of one of said tube portions in spaced relation to the adjacent ends of said portions, a body of electrically conductive liquid material disposed in said tube for movement in response to a balancing of the air pressures at the opposite sides thereof to and from a position in which it electrically connects said tube portions, said tube having an opening at the opposite side of said body of liquid from said means closing said bore through which the bore of said tube is adapted to communicate with the interior of said tire or tire tube, said tube being connected to said second seal for moving the latter from engagement with said body to permit the flow of air therethrough, means yieldably urging said second seal into engagement with said body, means adapted to electrically connect one of said tube portions to said sleeve member, the other of said tube portions having contact means adapted to be disposed adjacent the outer end of said sleeve member, and means insulating said other of said tube portions from said body, a second tube of larger diameter than and coaxial with said first named tube, said second tube being electrically connected to one of said tube portions and insulated from the other, the space between said tubes being sealed at its outer end and communicating with said opening in said first named tube, said second tube having an opening through which said space between said tubes is adapted to communicate with the interior of said tire or said tire tube, said second named means being disposed to close the bore of the one of said tube portions which in use is disposed inwardly of the other of said tube portions.

6. A valve stem unit for an air indicator apparatus for an automobile tire or tire tube having a valve stem including a sleeve member formed of electrically conductive material and having one end open and adapted to communicate with the interior of said tire or tire tube, said air indicator apparatus including an electrically operated signal for indicating predetermined changes in the air mass within said tire or tube, said valve stem unit being adapted to replace a conventional valve core assembly and comprising a generally tubular body having an annular seal adapted to engage a co-operating seat on said sleeve member, means connected to said body and adapted to engage said sleeve member for moving said seal to and from said seat, a second seal movable to and from a position in which it engages said body to prevent the flow of air therethrough, a tube disposed axially of said body and including first and second axially spaced portions formed of electrically conductive material and insulated from each other, means closing the bore of one of said tube portions in spaced relation to the adjacent ends of said portions, a body of electrically conductive liquid material disposed in said tube for movement in response to a balancing of the air pressures at the opposite sides thereof to and from a position in which it electrically connects said tube portions, said tube having an opening at the opposite side of said body of liquid from said means closing said bore through which the bore of said tube is adapted to communicate with the interior of said tire or tire tube, said tube being connected to said second seal for moving the latter from engagement with said body to permit the flow of air therethrough, means yieldably urging said second seal into engagement with said body, means adapted to electrically connect one of said tube portions to said sleeve member, the other of said tube portions having contact means adapted to be disposed adjacent the outer end of said sleeve member, and means insulating said other of said tube portions from said body, a second tube of larger diameter than and coaxial with said first named tube, said second tube being electrically connected to one of said tube portions and insulated from the other, the space between said tubes being sealed at its outer end and communicating with said opening in said first named tube, said second tube having an opening through which said space between said tubes is adapted to communicate with the interior of said tire or said tire tube, said second named means being disposed to close the bore of the one of said tube portions which in use is disposed inwardly of the other of said tube portions and the lengths of said tubes being such that at least a part of the bore portion between said means closing said bore and said body of liquid is disposed inwardly of said sleeve member and within said tire or tire tube when said valve stem unit is in use.

7. A valve stem unit for an air indicator apparatus for an automobile tire or tire tube having a valve stem including a sleeve member formed of electrically conductive material and having one end open and adapted to communicate with the interior of said tire or tire tube, said air indicator apparatus including an electrically operated signal for indicating predetermined changes in the air mass within said tire or tube, said valve stem unit being adapted to replace a conventional valve core assembly and comprising a generally tubular body having an annular seal adapted to engage a co-operating seat on said sleeve member, means connected to said body and adapted to engage said sleeve member for moving said seal to and from said seat, a second seal movable to and from a position in which it engages said body to prevent the flow of air therethrough, a tube disposed axially of said body and including first and second axially spaced portions formed of electrically conductive material and insulated from each other, means closing the bore of one of said tube portions in spaced relation to the adjacent ends of said portions, a body of electrically conductive liquid material disposed in said tube for movement in response to a balancing of the air pressures at the opposite sides thereof to and from a position in which it electrically connects said tube portions, said tube having an opening at the opposite side of said body of liquid from said means closing said bore through which the bore of said tube is adapted to communicate with the interior of said tire or tire tube, said tube being connected to said second seal for moving the latter from engagement with said body to permit the flow of air therethrough, and means yieldably urging said second seal into engagement with said body, the construction and arrangement of said valve stem unit being such that when in use, one of said tube portions is electrically connected to said sleeve member and the other of said tube portions is provided with contact means disposed adjacent the outer end of said sleeve member, said tube portions having telescopically interfitting adjacent ends, and a thin layer of insulating material separating said interfitting adjacent ends.

8. A valve stem unit for an air indicator apparatus for an automobile tire or tire tube having a valve stem including a sleeve member formed of electrically conductive material and having one end open and adapted to communicate with the interior of said tire or tire tube, said air indicator apparatus including an electrically operated signal for indicating predetermined changes in the air mass within said tire or tube, said valve stem unit being adapted to replace a conventional valve core assembly and comprising a generally tubular body having an annular seal adapted to engage a co-operating seat on said sleeve member, means connected to said body and adapted to engage said sleeve member for moving said seal to and from said seat, a second seal movable to and from a position in which it engages said body to prevent the flow of air therethrough, a tube disposed axially of said body and including first and second axially spaced portions formed of electrically conductive material and insulated from each other, means closing the bore of one of said tube portions in spaced relation to the adjacent ends of said portions, a body of electrically conductive liquid material disposed in said tube for movement in response to a balancing of the air pressures at the opposite sides thereof to and from a position in which it electrically connects said tube portions, said tube having an opening at the opposite side of said body of liquid from said means closing said bore through which the bore of said tube is adapted to communicate with the interior of said tire or tire tube, said tube being connected to said second seal for moving the latter from engagement with said body to permit the flow of air therethrough, means yieldably urging said second seal into engagement with said body, means adapted to electrically connect one of said tube portions to said sleeve member, the other of said tube portions having contact means adapted to be disposed adjacent the outer end of said sleeve member, and means insulating said other of said tube portions from said body, a second tube of larger diameter than and coaxial with said first named tube, said second tube being electrically connected to one of said tube portions and insulated from the other, the space between said tubes being sealed at its outer end and communicating with said opening in said first named tube, said second tube having an opening through which said space between said tubes is adapted to communicate with the interior of said tire or said tire tube, said second named means closing the bore of said first named tube at its inner end, additional means closing the bore of said first named tube at its outer end, and said second tube having an opening through which said space between said tubes is adapted to communicate with the interior of said tire or said tire tube.

9. A valve stem unit for an air indicator apparatus for an automobile tire or tire tube having a valve stem including a sleeve member formed of electrically conductive material and having one end open and adapted to communicate with the interior of said tire or tire tube, said air indicator apparatus including an electrically operated signal for indicating predetermined changes in the air mass within said tire or tube, said valve stem unit being adapted to replace a conventional valve core assembly and comprising a generally tubular body having an annular seal adapted to engage a co-operating seat on said sleeve member, means connected to said body and adapted to engage said sleeve member for moving said seal to and from said seat, a second seal movable to and from a position in which it engages said body to prevent the flow of air therethrough, a tube disposed axially of said body and including first and second axially spaced portions formed of electrically conductive material and insulated from each other, means closing the bore of one of said tube portions in spaced relation to the adjacent ends of said portions, a body of electrically conductive liquid material disposed in said tube for movement in response to a balancing of the air pressures at the opposite sides thereof to and from a position in which it electrically connects said tube portions, said tube having an opening at the opposite side of said body of liquid from said means closing said bore through which the bore of said tube is adapted to communicate with the interior of said tire or tire tube, said tube being connected to said second seal for moving the latter from engagement with said body to permit the flow of air therethrough, means yieldably urging said second seal into engagement with said body, means adapted to electrically connect one of said tube portions to said sleeve member, the other of said tube portions having contact means adapted to be disposed adjacent the outer end of said sleeve member, and means insulating said other of said tube portions from said body, a second tube of larger diameter than and coaxial with said first named tube, said second tube being electrically connected to one of said tube portions and insulated from the other, the space between said tubes being sealed at its outer end and communicating with said opening in said first named tube, said second tube having an opening through which said space between said tubes is adapted to communicate with the interior of said tire or said tire tube, said second named means closing the bore of said first named tube at its inner end, additional means closing the bore of said first named tube at its outer end, and said second tube having its inner end of reduced diameter and engaging said first named tube, said second tube being slotted adjacent its inner end for communication between the space between said tubes and the interior of said tire or said tire tube.

References Cited in the file of this patent

UNITED STATES PATENTS

| | | |
|---|---|---|
| 2,190,117 | Griffith | Feb. 13, 1940 |
| 2,296,411 | Wills | Sept. 22, 1942 |
| 2,445,959 | Luper | July 27, 1948 |
| 2,566,369 | Putman | Sept. 4, 1951 |